United States Patent [19]

Inoue et al.

[11] Patent Number: 5,585,189
[45] Date of Patent: Dec. 17, 1996

[54] PIGMENT DISPERSION COMPOSITION

[75] Inventors: Hiroshi Inoue; Shigeyasu Inoue, both of Osaka; Seishiro Ito, Ikoma, all of Japan

[73] Assignee: Sakura Color Products Corporation, Osaka, Japan

[21] Appl. No.: 451,152

[22] Filed: May 26, 1995

[30]     Foreign Application Priority Data

| Jun. 2, 1994 | [JP] | Japan | 6-121414 |
| Oct. 11, 1994 | [JP] | Japan | 6-284596 |
| Oct. 11, 1994 | [JP] | Japan | 6-284597 |

[51] Int. Cl.$^6$ .................... B32B 15/08; B32B 27/00; C09B 67/50; C23C 14/14; C08K 5/47
[52] U.S. Cl. .................... 428/461; 106/412; 106/500; 427/528; 428/463; 524/88; 524/376; 524/389; 524/786
[58] Field of Search ..................... 106/412, 500; 428/413, 461; 524/88, 376, 389, 786; 427/528; 204/181.2

[56]              References Cited

U.S. PATENT DOCUMENTS

| 3,844,908 | 10/1974 | Matsuo et al. | 204/35 |
| 4,371,643 | 2/1983 | Thomas | 524/88 |
| 4,478,968 | 10/1984 | Jaffe | 524/88 |
| 5,334,297 | 8/1994 | Nakada et al. | 208/181.2 |
| 5,416,135 | 5/1995 | Endres et al. | 524/436 |

FOREIGN PATENT DOCUMENTS

| 38-1715 | 3/1963 | Japan . |
| 44-12566 | 6/1969 | Japan . |
| 46-16566 | 5/1971 | Japan . |
| 51-35177 | 9/1976 | Japan . |
| 52-5010 | 2/1977 | Japan . |
| 05-93296 | 4/1993 | Japan . |

*Primary Examiner*—Veronica P. Hoke
*Attorney, Agent, or Firm*—Armstrong, Westerman, Hattori, McLeland, & Naughton

[57]              ABSTRACT

The present invention discloses a pigment dispersion composition for depositing a multiplicity of pores existing in anodic oxide films formed on a surface of an aluminum or aluminum alloy material by way of electrophoresis for coloration, the pores being preliminarily enlarged to have a diameter of 50 nm to 250 nm. The pigment dispersion composition comprises water, a pigment dispersant and a pigment. The pigment dispersed in the pigment dispersion composition has a median particle size of not greater than 250 nm in a particle-size distribution thereof with not greater than 30% of the pigment particles being impassable through a sieve having a mesh size of 300 nm. The pigment dispersion composition is useful for coloration of the anodic oxide films, and has excellent repeated-coloration characteristics.

11 Claims, No Drawings

PIGMENT DISPERSION COMPOSITION

BACKGROUND OF THE INVENTION

1. Field of the Invention

The present invention relates to a pigment dispersion composition for coloring porous anodic oxide films on aluminum by pigment deposition in the pores, which is adapted for bright and fast coloration of surfaces of aluminum or aluminum alloy materials for use as facing materials of buildings and the like. More particularly, the invention relates to a pigment dispersion composition for depositing pores existing in anodized oxide films on a surface of aluminum or aluminum alloy material by way of electrophoresis for coloration of the aluminum oxide film.

2. Related Art

Aluminum and alloys thereof are often used as facing materials for buildings. These metals are typically covered with aluminum oxide and, therefore, exhibit a reduced adhesion with a paint coating formed by an ordinary coating method. To overcome such a drawback, various coating methods have been proposed. For example, Japanese Patent No. 65742 discloses a method for coloring an aluminum material by immersing it in a solution containing a water-soluble or oil-soluble dye dissolved therein. Further, Japanese Examined Patent Publications No. 38-1715 (1963), No. 44-12566 (1969) and No. 46-16566 (1971) disclose a method for inorganically coloring an aluminum material in an aqueous solution containing a metallic salt. Still further, Japanese Examined Patent Publications No. 51-35177 (1976) and No. 52-5010 (1977) disclose a method for allowing a pigment dispersed in water with a surface-active agent to be adsorbed by aluminum oxide formed on a surface of an aluminum material by way of electrophoresis. Yet further, Japanese Unexamined Patent Publication No. 5-93296 (1993) discloses a method for depositing pores existing in anodic oxide films formed on a surface of aluminum or aluminum alloy material with an aqueous dispersion of an organic pigment or carbon black by way of electrophoresis. In accordance with this method, the pores in the anodic oxide films are enlarged and then deposited with the aqueous dispersion of the organic pigment or carbon black. The aqueous dispersion is prepared by dispersing in water containing an anionic surface-active agent and carbon black or organic pigment which is finely disaggregated by first dissolving the organic pigment in concentrated sulfuric acid and then pouring it in water for precipitation or by way of a plasma treatment.

In accordance with the method disclosed in Japanese Patent No. 65742, however, the sunlight-fastness is unsatisfactory due to the use of a dye, though the aluminum material can be brightly colored.

In accordance with the method disclosed in Japanese Examined Patent Publication No. 38-1715, the light-fastness is excellent by virtue of the use of an inorganic compound. However, the method suffers such inconveniences as limited color variation and insufficient brightness in coloring an aluminum material.

Where an aluminum material is anodized by an ordinary method, pores existing in the resultant aluminum oxide film typically have diameters of not greater than 50 nm when formed by way of a low-voltage anodization, or have diameters of about 180 nm when formed by way of a high-voltage anodization. In accordance with the method disclosed in Japanese Examined Patent Publication No. 51-35177, the pores in the anodic oxide film formed on the aluminum material by an ordinary method are deposited by way of electrophoresis with a pigment dispersion in which pigment particles having particle diameters of not greater than 1,000 nm are dispersed in water using a surface-active agent. Thus, the pigment particles used are large in diameter relative to the pores in the anodic oxide film, posing the following problems. The pigment particles, though having a wide particle-size distribution, mostly have sizes larger than the pores. Therefore, a very small number of pigment particles can migrate into the pores by way of electrophoresis, while the major part of pigment particles having larger sizes are adsorbed and stay around the mouths of the pores. This prevents micro-sized pigment particles from migrating into the pores, and causes the pigment coat to be easily scaled off during a washing process performed after the coloring process, resulting in a coloring failure. Further, the dispersant used to disperse the pigment remains in the pores. This may deteriorate the resistance of the aluminum oxide film to solvents and other chemicals used for the coloration.

In accordance with the method disclosed in Japanese Unexamined Patent Publication No. 5-93296, the particle size of the organic pigment is reduced to a level smaller than the diameters of the pores by way of the plasma treatment or by first dissolving the organic pigment in a 98% conc. sulfuric acid and then pouring it in water for microparticulate precipitation, before the pigment is dispersed in water. Though the pigment finely disaggregated by way of the aforesaid pretreatments can deeply migrate into the pores of the aluminum oxide film, the preparation of the dispersion is not necessarily satisfactory. In addition, these pretreatments may cause hazards resulting from the use of plasma wave or concentrated sulfuric acid, thereby posing an operational problem. Furthermore, these pretreatments accompany a side reaction by which the pigment is rendered into a substance susceptible to ionization. This may cause contamination by ionic inclusions which deteriorate the stability of the dispersion.

As can be understood from the foregoing, it is required to reduce the diameter of pigment particles dispersed in a dispersion to a level smaller than that of pores existing in anodic oxide films, in order for the pigment particles to migrate into the pores to a satisfactory depth. However, the preparation of the dispersion satisfying such requirements is not easy.

It is, therefore, an object of the present invention to provide a pigment dispersion composition which is suitable for depositing in pores existing in anodic oxide films for coloration and has an excellent property to meet requirements for repeated coloration.

In general, pigments each have a characteristic particle-size distribution. Where a commercially available pigment is used without being subjected to a preliminary fine-disaggregation process, a fraction of pigment particles having particle sizes smaller than those of pores in anodic oxide films may enter the pores to some extent. However, a major fraction of pigment particles having larger particle sizes may cause problems as previously mentioned. Further, pigments having the same average particle size may have different particle-size distributions. This means that the content of pigment particles having a larger size varies depending on the particle-size distribution of the pigment and, therefore, the average particle size does not necessarily properly represent the particle-size distribution.

As a result of intensive study, the present inventors have found a particle size and other physical characteristics of a pigment dispersion composition suitable for depositing in pores in anodic oxide films for coloration and a method for preparing such a pigment dispersion composition.

SUMMARY OF THE INVENTION

The present invention is directed to a pigment dispersion composition for depositing a multiplicity of pores having diameters of 50 nm to 250 nm which are present in anodic oxide films formed on a surface of an aluminum or aluminum alloy material by way of electrophoresis for coloration.

In accordance with the present invention, there is provided a pigment dispersion composition for depositing in pores having diameters of 50 nm to 250 nm which are present in aluminum oxide formed on a surface of an aluminum or aluminum alloy material by way of electrophoresis for coloration. The pigment dispersion composition comprises water, a pigment dispersant, and a pigment having a median particle size of not greater than 250 nm in a particle-size distribution thereof with not greater than 30% of the pigment particles being impassable through a sieve having a mesh size of 300 nm.

DESCRIPTION OF THE PREFERRED EMBODIMENTS

The present invention will now be described in detail.

A pigment dispersion composition in accordance with the present invention is adapted to deposit in pores having diameters of 50 nm to 250 nm which are present in anodic oxide films formed on a surface of aluminum or an aluminum alloy by way of electrophoresis for coloration. The pigment dispersion comprises water, pigment dispersant, and a pigment having a median particle size of not greater than 250 nm in a particle-size distribution thereof with not greater than 30% of the pigment particles being impassable through a sieve having a mesh size of 300 nm.

The median particle size is defined as a diameter of a particle at a 50%-cumulative point which is determined by accummulating particles from a particle having the smallest particle size in the particle-size distribution.

The proportion of pigment particles which are impassable through the sieve is determined by way of a photometrical measurement.

Preferably, the pigment is selected from the group consisting of condensed polycyclic pigments such as quinacridone-type, perinone-type, perylene-type, dioxazine-type, isoindolinone-type, isoindolin-type, quinophthalone-type, anthraquinone-type, pyrrolopyrrole-type, thioindigo-type and metal complex-type pigments, other organic pigments such as phthalocyanine-type and condensed azo-type pigments, inorganic pigments such as carbon black, titanium oxide and silicon dioxide, and colored synthetic polymer powders. The pigment has a median particle size of not greater than 250 nm in a particle-size distribution thereof with not greater than 30% of the pigment particles being impassable through a sieve having a mesh size of 300 nm. The pigment has a particle-size distribution biased to the side of the smaller particle size and, hence, a majority of the pigment particles have a smaller particle size.

In general, aluminum or an aluminum alloy is anodized in an aqueous solution of an inorganic acid such as sulfuric acid and/or an organic acid such as oxalic acid under application of a predetermined current, and the anodic oxide film contains pores having diameters of not greater than 50 nm. It is, of course, possible to deposit in pores formed by an ordinary method with a pigment for coloration. However, the use of a pigment having a particle diameter greater than that of the pores may result in a failure in repeated coloration and a defective color coat.

The anodic oxide film of aluminum or aluminum alloy (hereinafter referred to generally as "aluminum") to which the pigment dispersion composition of the present invention is applicable is obtained by the following two methods. One is to anodize aluminum in an acidic aqueous solution containing one or more acids selected from the group consisting of inorganic acids such as mineral acid and phosphoric acid and organic acids such as oxalic acid and maleic acid at a voltage higher than a usually employed voltage, for example, at a voltage of 170 V to form a porous anodic oxide film containing pores having diameters greater than those of pores formed by an ordinary method. The other is to immerse aluminum having anodic oxide film formed thereon by an ordinary method in an acidic aqueous solution containing one or more acids selected from the group consisting of inorganic acids such as mineral acid and sulfuric acid and organic acids such as oxalic acid and sulfamic acid or to alternately repeat the immersion process and AC electrolysis process to enlarge the pores. These methods allow anodic oxide film to contain pores having diameters of 50 nm to 250 nm.

The pigment dispersion composition of the present invention is prepared by adding a pigment to an aqueous solution of a pigment dispersant, disaggregating and dispersing the pigment in the solution by means of a dispersing machine such as roll mill, ball mill or sand mill, diluting the resultant dispersion to a desired concentration and removing larger particles therefrom by way of centrifugation, Scharples-type centrifugation and filtration. If a desired particle-size distribution cannot be obtained by the first particle classification process, the dispersing process and particle classification process are repeated until the desired particle-size distribution is obtained. If the proportion of particles impassable through a sieve having a mesh size of 300 nm is not greater than 30%, there is no need for particle classification.

Thus, the pigment contained in the dispersion has a median particle size of not greater than 250 nm, preferably not greater than 200 nm with not greater than 30% of the pigment particles being impassable through the sieve having a mesh size of 300 nm.

Since the pigment contained in the pigment dispersion composition has a particle-size distribution as described above, the pores in the anodic oxide film can readily be deposited with the pigment for coloration of aluminum without any problems in terms of the particle diameter. The coloration problem which would be caused by larger particles can be eliminated because the proportion of pigment particles impassable through the sieve having a mesh size of 300 nm is low. At the same time, because the proportion of pigment particles passable through the sieve having a mesh size of 300 nm is not less than 70%, repeated coloration can be achieved to impart a fast and bright primary color to an aluminum material.

The pigment for use in the pigment dispersion composition of the present invention is preferably excellent in weatherability, heat resistance, solvent resistance and other durability properties. Examples of such pigments include condensed polycyclic pigments such as quinacridone-type, perinone-type, perylene-type, dioxazine-type, isoindolinone-type, isoindolin-type, quinophthalone-type, anthraquinone-type, pyrrolopyrrole-type, diketopyrrolopyrrol-type, thioindigo-type and metal complex-type pigments, and other organic pigments such as phthalocyanine-type pigments and pigments of condensed azo-based compounds and derivatives thereof.

Examples of usable inorganic pigments include carbon black, titanium oxide and silicon dioxide. These inorganic pigments have satisfactory durability. Other usable pigments include synthetic polymer pigments such as obtained by emulsion polymerization and suspension polymerization, and colored polymers obtained from these synthetic polymers. It has been reported that these polymerization methods yield polymer particles having a very small particle size (see Shikizai, Vol. 63, No. 3, pp. 143, 1990). That is, a preferred pigment includes particles of inorganic compounds, organic compounds, and synthetic polymers and/or colored powders thereof.

When considering the size and physicochemical surface characteristics of particles, the specific surface area thereof is generally an important factor. Unlike carbon black particles having rough surfaces, organic pigment particles have surfaces of little roughness. The smaller the diameter of smallest-unit particles constituting a powdery substance (i.e., primary particles), the larger the specific surface area thereof. Accordingly, the particles attract each other and exhibit an increased cohesion, thereby having a tendency to form firmly aggregated bodies (i.e., secondary particles). Further, the greater the specific surface area, the greater the coloring ability.

As to reddish pigments such as of quinacridone-based, anthraquinone-based, diketopyrrolopyrrole-based, perylene-based or perinone-based compounds and derivatives thereof having a specific surface area of not greater than 30 $m^2/g$, particles of the pigments cannot easily be disaggregated in the dispersion process. When such a pigment is used for a pigment dispersion composition, the amount of the pigment deposited in the pores in the anodic oxide film is small, thus resulting in uneven coloration and low yield. Though pigment particles can be disaggregated by applying a large mechanical force thereto, gelation and re-aggregation of the pigment particles may occur over time. Where the pigment has a specific surface area of greater than 100 $m^2/g$, it is difficult to reduce aggregated pigment particles into primary particles in the dispersion process. Accordingly, the dispersion contains a multiplicity of secondary particles having particle diameters greater than those of the pores in the anodic oxide film. This deteriorates the weatherability of the resultant coat. Such pigment can no longer have satisfactory properties as a pigment. Consequently, a pigment having a specific surface area of 30 to 100 $m^2/g$ preferably forms an excellent pigment dispersion composition, thereby imparting an excellent weatherability and bright coloration to the aluminum material.

Pigments such as of phthalocyanine-based compounds and derivatives thereof have the same tendency as the aforesaid reddish pigments when the specific surface area thereof is changed. The specific surface area thereof preferably ranges from 45 $m^2/g$ to 100 $m^2/g$.

In order to obtain a desired color, it is, of course, possible to employ a mixture of two or more pigments selected from the aforesaid pigments.

A pigment concentration of the pigment dispersion composition for preferable coloration is about 0.05% to 50% by weight, preferably 0.1% to 20% by weight. A pigment concentration lower than the above requires a longer time for coloration, thereby reducing productivity. In addition, it may become impossible to impart a deep color to the aluminum material. A pigment concentration higher than the above makes the adjustment of color density difficult, and causes uneven coloration because the pigment not only enters the pores but also deposits on the surface of the aluminum material.

Dispersants for dispersing the pigment include water-soluble resins and polymers, and polymer compounds and gums which are rendered water-soluble by neutralization with an acid or base. These may be used either alone or in combination. Examples of specific dispersants include natural polymers such as shellac and arabic gums, polymer compounds such as acrylic acid-styrene copolymer, polyacrylamide, styrene-maleic acid copolymer and polyvinyl alcohol, polyvinyl pyrrolidone which are obtained by polymerization of one or more compounds having $\alpha$, $\beta$-ethylene bond, or modified compounds thereof. Among the aforesaid compounds, water-soluble resins are preferable because the quality thereof is stable. Acrylic acid-styrene copolymer is more preferable because it provides a stable dispersion.

The amount of the dispersant to be used is determined by a dispersion state and viscosity thereof. In the case of a water-soluble resin, the solid content thereof is i part to 500 parts by weight, preferably 10 parts to 200 parts by weight with respect to 100 parts of the pigment. Where the amount is less than one part, it requires a long time to disaggregate the pigment into fine particles, resulting in reaggregation of the pigment particles. Where the amount is greater than 500 parts, the viscosity of the dispersion becomes higher, thereby requiring a longer coloration time.

To increase the water-solubility of the pigment dispersant, the pigment dispersant is first dissolved in a water-soluble organic solvent, e.g., an alcohol such as ethanol, a glycol such as ethyleneglycol or a cellosolve such as butylcellosolve which is miscible with water in a certain concentration, or in a mixture thereof with water, and then added to water. In this case, the amount of the water-soluble organic solvent is less than 50% by weight, preferably 30% by weight with respect to the pigment dispersion composition.

The pigment particles dispersed in the pigment dispersant dissolved in water are electrically charged, and the surface potential (hereinafter referred to as zeta potential $\zeta$) thereof is preferably as high as possible to favorably deposit the pores in the anodic oxide film with the pigment by way of electrophoresis for coloration. To increase the zeta potential of the pigment, the pigment dispersant is preferably cationic or anionic, rather than nonionic. If the absolute value of the zeta potential is not lower than 10 V, the pigment particles are favorably migrated into the pores in the anodic oxide film. In the electrophoretic process, the anodized aluminum material is used as the cathode if the zeta potential of the pigment is positive, or used as the anode if the zeta potential is negative.

In general, fine particles dispersed in a dispersion medium have an electric charge opposite to that of the dispersion medium because of induction by the dispersion medium, and electrically repel each other to keep the dispersing state. When electricity is passed through the dispersion system, the charged fine particles migrate to an electrode having an opposite potential and discharge thereat. Therefore, if the electrophoretic coloration is performed by using a pigment dispersion composition containing a cationic pigment dispersant, cationic dispersion medium and positively charged pigment, the anodic aluminum oxide to be colored should be used as a cathode. In this case, hydrogen ions having a positive charge also migrate to the cathode and discharge to evolve hydrogen gas (which has no charge). It has been found that the evolution of hydrogen gas sometimes interferes with electrophoresis to cause uneven coloration. The pigment dispersion composition of the present invention employs a basic water-soluble resin such as an alkali metal salt of acrylic acid-styrene copolymer, and the pH thereof is adjusted to 4 to 11. If the pigment dispersion composition is strong acid or alkali, aluminum which is an amphoteric metal would be corroded. Therefore, the pH of the pigment dispersion composition is preferably adjusted to 7.5 to 11 to be rendered alkaline. If the pigment dispersion composition is alkaline, the dispersion medium, of course, becomes anionic, and the pigment particles induced by the electrical charge of the dispersion medium have a negative zeta potential. Therefore, when the aluminum material is colored by way of electrophoresis, the negatively charged pigment particles migrate to the positively charged anodic aluminum oxide film and discharge. Because hydrogen ions do not migrate to the cathode, hydrogen gas does not evolve, causing no color unevenness. A zeta potential of not greater than −10 mV allows the pigment particles to easily migrate into the pores in the anodic oxide film by way of electrophoresis. The electric conductivity of the pigment dispersion composition is adjusted to 100 μs/cm to 10,000 μs/cm, preferably to 300 μs/cm to 6,000 μs/cm. If a pigment and pigment dispersant of standard quality are used and no special electrolyte is added thereto, the electric conductivity of the pigment dispersion composition is kept in the aforesaid range. If the pigment dispersion composition contains an electrolyte or inclusion such as an anion, e.g., chloride ion or sulfate ion, or a metal ion, e.g., iron ion, nickel ion, aluminum ion the electric conductivity thereof becomes higher. If the electric conductivity is increased, the dispersion medium consumes electric current which is applied thereto for the migration of the pigment particles, thereby interfering with electrophoresis. Further, the ionic inclusions are adsorbed on the surface of the anodic oxide film by electrophoresis and make the electrophoretic current non-uniform. This may cause a coloration failure such as uneven coloration. The concentration of the inclusion is preferably reduced to not greater than 1,000 ppm, more preferably to not greater than 300 ppm.

The pigment dispersion composition of the present invention may be prepared by using the aforesaid pigments either alone or in combination. It is also possible to use a mixture of two or more pigment dispersion compositions including different pigments. Further, the coloration process may be repeated two or more times to over-coat the anodic oxide film formed on the aluminum material. This is achieved by using the same kind of pigment dispersion composition or by using a different kind of pigment dispersion composition for every coloration.

As can be understood from the foregoing, the pigment dispersion composition of the present invention is prepared by dispersing in water a pigment selected from inorganic pigments, organic pigments and colored synthetic resins. The pigment has a median particle size of not greater than 250 nm, preferably 200 nm in a particle-size distribution thereof with not greater than 30% of the pigment particles being impassable through a sieve having a mesh size of 300 nm. That is, the pigment has a particle-size distribution biased to the side of the smaller particle size and, hence, a majority of the pigment particles have a smaller particle size. The pigment particles are deposited in pores having enlarged diameters of 50 nm to 250 nm in anodic oxide films formed on a surface of an aluminum or aluminum alloy material by way of electrophoresis for coloration. Therefore, the pigment dispersion composition of the present invention allows for an economical and efficient coloration of aluminum or aluminum alloy materials. Further, the use of the pigment dispersion composition makes it possible to prevent any interference which may otherwise occur around the mouths of the pores due to pigment particles having a larger particle size. Such interference is essential to the conventional coloring methods. Thus, the pigment dispersion composition allows for repeated coloration without any problem, thereby realizing a color coating with excellent color fastness.

Further, the pigment dispersion composition of the present invention contains a reddish pigment such as of quinacridone-based, anthraquinone-based, diketopyrrolopyrrole-based, perylene-based or perinone-based compound and a derivative thereof which has a specific surface area of 30 $m^2/g$ to 100 $m^2/g$, or alternatively a pigment such as of phthalocyanine-based compound or a derivative thereof which has a specific surface area of 45 $m^2/g$ to 100 $m^2/g$. Therefore, pigment particles can easily be disaggregated in a dispersing process, thereby allowing the pigment particles to deeply migrate into the pores in the anodic oxide films by way of electrophoretic coloration. This ensures uniform coloration of aluminum materials with a high yield. In addition, the present invention provides a wide selection of colors from a metallic color having some transparency to a deep color having a high concealing power.

EXAMPLE 1

Materials to be colored were prepared in the following manner to evaluate pigment dispersion compositions of the present invention. To prepare two kinds of anodic oxide films A and B, industrial-grade aluminum plates in compliance with JIS A1050 TP-H and having a size of 50 mm×50 mm were preliminarily treated by an ordinary method, and then anodized by the following manner.

Anodic Oxide Film A

The pretreated aluminum plates each attached to an anode were electrolyzed in a 0.3% aqueous solution of oxalic acid at a constant voltage of DC 150 V at a temperature of 20° C. for six minutes. Thus, an anodic oxide film A with a thickness of 10 μm containing a multiplicity of pores having an average diameter of 30 nm was formed on a surface of the aluminum plate.

Anodic Oxide Film B

The anodic oxide film A thus obtained was immersed in a 5% aqueous solution of phosphoric acid for 100 minutes to allow the pores contained therein to be enlarged to an average diameter of about 160 nm. Thus, the anodic oxide film B was obtained.

Pigment dispersion compositions were prepared in the following manner.

Pigment Dispersion Composition 1C

A mixture of 15 % by weight of an acrylic acid-styrene copolymer (available from Johnson Polymer Co. under a trade name of JONCRYL 62), 30% by weight of phthalocyanine-type blue pigment (available from Dainippon Ink & Chemicals, Inc. under a trade name of FASTOGEN BLUE TGR, C. I. Pig. Blue 15:3) and 55% by weight of water was stirred for 60 minutes by means of Labomixer to obtain a slurry. To the slurry were added 240 ml of glass beads having a diameter of 0.5 mm to 0.75 mm to increase the total volume to 300 ml, and the slurry was stirred for 30 minutes to obtain a pigment dispersion. Thereafter, the pigment dispersion was diluted with water to a pigment concentration of 10% by weight, and particles having large diameters were precipitated by way of ultra-centrifugation at 10,000 rpm for 30 minutes. The supernatant solution was extracted from the pigment dispersion to obtain a pigment dispersion composition 1C.

Pigment Dispersion Composition 1D

A mixture of 15% by weight of an acrylic acid-styrene copolymer (available from Johnson Polymer Co. under a trade name of JONCRYL 62), 20% by weight of quinacridone-type red pigment (available from Hoechst AG under a trade name of HOSTAPERM PINK E, C. I. Pig. Red 122:3) and 65% by weight of water was stirred for 24 hours in a ball mill (the volume ratio of the mixture to the ball mill is 30%) to obtain a pigment dispersion. The pigment dispersion was diluted with water to a pigment concentration of 5% by weight, and then subjected to ultra-centrifugation for 30 minutes. The supernatant solution was extracted from the pigment dispersion to obtain a pigment dispersion composition 1D.

Pigment Dispersion Composition 1E

A mixture of 40% by weight of an acryl-based copolymer (available from Kanebo NSC under a trade name of KBK3D811), 15% by weight of carbon black #40 (available from Mitsubishi Kasei Corp.) and 45% by weight of water was stirred by means of Labomixer to obtain a slurry. To the slurry were added 240 ml of glass beads having a diameter of 0.5 mm to 0.75 mm to increase the total volume to 300 ml, and the slurry was stirred for 30 minutes to obtain a pigment dispersion. Thereafter, the pigment dispersion was diluted with water to a pigment concentration of 2% by weight, and then subjected to ultra-centrifugation for 15 minutes. The supernatant solution was extracted from the pigment dispersion to obtain a pigment dispersion composition 1E.

Pigment dispersion compositions 1F, 1G and 1H were prepared in substantially the same manners as those employed to prepare the pigment dispersion compositions 1C, 1D and 1E, respectively, except that the ultra-centrifugation process was not carried out.

A pigment dispersion composition 1I was prepared by blending 10% by weight of the pigment dispersion composition 1C with 90% of the pigment dispersion composition 1D.

A pigment dispersion composition 1J was prepared in substantially the same manner as that employed to prepare the pigment dispersion composition 1D, except that the ultra-centrifugation process was carried out for 15 minutes.

A pigment dispersion composition 1K was prepared in substantially the same manner as that employed to prepare the pigment dispersion composition 1C, except that the ultra-centrifugation process was carried out for 15 minutes.

The median particle size (nm), percentage (%) of particles impassable through a sieve having a mesh size of 300 nm, zeta potential (mV), pH, electric conductivity(μs/cm) and content (ppm) of ionic inclusions of each pigment dispersion composition were measured. The measurement is shown in Table 1.

TABLE 1

| Pigment dispersion composition | 1C | 1D | 1E | 1F | 1G | 1H | 1J | 1K |
|---|---|---|---|---|---|---|---|---|
| Median particle size (nm) | 70 | 100 | 40 | 200 | 350 | 230 | 250 | 120 |
| Impassable particles (%) | 8 | 15 | 5 | 25 | 43 | 37 | 30 | 11 |
| Zeta potential (mV) | −38 | −25 | +17 | −35 | −23 | +15 | −28 | −39 |
| pH | 9.8 | 8.6 | 4.4 | 9.5 | 8.2 | 6.3 | 8.5 | 9.8 |
| Conductivity (μs/cm) | 5300 | 2500 | 3200 | 7600 | 8200 | 8700 | 2200 | 5100 |
| Ionic inclusion (ppm) | 280 | 190 | 270 | 1200 | 840 | 610 | 380 | 710 |

In electrolytic cells respectively containing the aforesaid pigment dispersion compositions 1C to 1K, the aluminum plates respectively formed with the anodic oxide films A and B were each attached to a cathode (where the zeta potential of the employed pigment was positive) or to an anode (where the zeta potential of the pigment was negative), and a carbon electrode was used as the counter electrode. A DC voltage applied to each cell was raised at a rate of 1 V per second for 120 seconds, and a voltage of 120 V was applied to each cell for one minute to color the aluminum plates each formed with the anodic oxide film A or B. The aluminum plates thus colored were washed with water, and coloration states of the aluminum plates observed before and after the washing process were evaluated. The evaluation results are shown in Table 2.

To evaluate repeated coloration characteristics of each pigment dispersion composition, the voltage application process and washing process were repeated until uneven coloration was observed. The evaluation results of the repeated coloration are shown in Table 2, in which evaluations "A", "B" and "C" are assigned to pigment dispersion compositions which allowed for coloration cycles of not less than 50 times, 5 to 49 times and not greater than 5 times, respectively.

TABLE 2

| Pigment dispersion composition | Anodic oxide film A | | Anodic oxide film B | | Cyclic Coloration |
|---|---|---|---|---|---|
| | Before rinsing | After rinsing | Before rinsing | After rinsing | |
| 1C | Deep blue | Pale blue (Uneven coloration) | Deep blue | Deep blue | A |
| 1D | Deep red | Not colored | Deep red | Deep red | A |
| 1E | Deep black | Pale black (Uneven coloration) | Deep black | Deep black | A |
| 1F | Deep blue* | Not colored | Deep blue* | Deep blue* | C |
| 1G | Deep red | Not colored | Deep red | Pale red (Uneven coloration) | C |
| 1H | Deep black | Not colored | Deep black | Pale black (Uneven coloration) | C |
| 1I | Not tested | | Deep purple | Deep purple | A |
| 1J | Not tested | | Deep red | Deep red | B |
| 1K | Deep blue | Not colored | Deep blue | Deep blue | A |

*Abnormal current occurred in electrophoresis.

As can be seen from Table 2, the anodic oxide film B containing pores of larger diameters were properly colored with the pigment dispersion compositions of the present invention even after the washing process, while the anodic oxide film A containing pores of smaller diameters were not properly colored. Supposedly, such a difference was caused because the pigment included in the pigment dispersion composition migrated into the pores of the anodic oxide film B more easily. Further, the pigment dispersion compositions 1C to 1E, 1I and 1K colored the anodic oxide film B with fastness. This indicates that there is no need to over-coat the anodic oxide film B with a resin for baking finish to prevent pigment scale-off. The pigment dispersion compositions 1G and 1H including pigments in which the percentage of pigment particles impassable through a sieve having a mesh size of 300 nm exceeded 30% caused uneven coloration after the washing process and were inferior in the repeated-coloration characteristics. Similarly, the pigment dispersion composition 1F including a large amount of ionic inclusions caused uneven coloration after the washing process and was inferior in the repeated-coloration characteristics.

EXAMPLE 2

A mixture of 30% by weight of an acrylic acid-styrene copolymer (available from Johnson Polymer Co. under a trade name of JONCRYL 62), 30% by weight of each of the following reddish pigments and 40% by weight of water was stirred for 60 minutes by means of Labomixer to obtain a slurry. To the slurry were added 240 ml of glass beads having a diameter of 0.5 mm to 0.75 mm to increase the total volume to 300 ml, and the slurry was stirred for 30 minutes to obtain a pigment dispersion. Then, a pigment dispersion for a pigment dispersion composition 2C, 2D, 2E, 2F, 2G or 2H was subjected to Scharples-type centrifugation, and a pigment dispersion for a pigment dispersion composition 2I was not subjected to Scharples-type centrifugation. Thereafter, the pigment dispersion was diluted with water to a pigment concentration of 2% by weight, and particles having large diameters were precipitated by way of ultra-centrifugation at 10,000 rpm for 30 minutes. The supernatant solution was extracted from the pigment dispersion to obtain each of the pigment dispersion compositions 2C, 2D, 2E, 2F, 2G and 2H.

Pigment for the Pigment Dispersion Composition
2C

An anthraquinone-based compound available from Ciba-Geigy Ltd. under a trade name of CHROMOPHTAL RED A3B (C. I. Pigment Red 177 with a specific surface area of 97 $m^2/g$.)

Pigment for the Pigment Dispersion Composition
2D

A quinacridone-based compound available from Ciba-Geigy Ltd. under a trade name of CINGUASIA RED Y-RT-759-D (C. I. Pigment Violet 19 with a specific surface area of 61 $m^2/g$.)

Pigment for the Pigment Dispersion Composition
2E

A quinacridone-based compound available from Dainippon Ink & Chemicals, Inc. under a trade name of FASTOGEN SUPERMAGENTA RH (C. I. Pigment Red 122 with a specific surface area of 55 $m^2/g$.)

Pigment for the Pigment Dispersion Composition
2F

A diketopyrrolopyrrole-based compound available from Ciba-Geigy Ltd. under a trade name of CHROMOPHTAL DPP RED BP (C. I. Pigment Red 254 with a specific surface area of 30 $m^2/g$.)

Pigment for the Pigment Dispersion Composition
2G

A quinacridone-based compound available from Ciba-Geigy Ltd. under a trade name of CINGUASIA RED Y-RT-759-D (C. I. Pigment Violet 19 with a specific surface area of 23 $m^2/g$.)

Pigment for the Pigment Dispersion Composition
2H

A diketopyrrolopyrrole-based compound available from Ciba-Geigy Ltd. under a trade name of CHROMOPHTAL DPP RED BO (C. I. Pigment Red 254 with a specific surface area of 16 $m^2/g$.)

The pigment dispersion composition 2I was prepared in substantially the same manner as that employed to prepare the pigment dispersion composition 2C, except that the Scharples-type centrifugation was not carried out.

The properties of each pigment dispersion composition are shown in Table 3.

TABLE 3

| Pigment dispersion composition | 2C | 2D | 2E | 2F | 2G | 2H | 2I |
|---|---|---|---|---|---|---|---|
| Median particle size (nm) | 60 | 100 | 190 | 240 | 300 | 380 | 120 |
| Impassable particles (%) | 7 | 12 | 18 | 30 | 50 | 61 | 18 |
| Zeta potential (mV) | −48 | −35 | −32 | −33 | −25 | −29 | −41 |
| pH | 9.9 | 9.2 | 8.9 | 9.5 | 9.5 | 8.6 | 9.5 |
| Conductivity (us/cm) | 1500 | 1800 | 1600 | 1500 | 1800 | 1300 | 2800 |
| Ionic inclusion (ppm) | 430 | 360 | 480 | 350 | 260 | 310 | 630 |

In electrolytic cells respectively containing the pigment dispersion compositions thus prepared, the aluminum plates respectively formed with anodic oxide films A and B were each attached to an anode, and a carbon electrode was used as the counter electrode. Electrophoretic coloration test and the evaluation of the pigment dispersion compositions 2C to 2I were carried out in the same manner as described in EXAMPLE 1. The evaluation results are shown in FIG. 4.

TABLE 4

| Pigment | Anodic oxide film A | | Anodic oxide film B | | |
|---|---|---|---|---|---|
| dispersion composition | Before rinsing | After rinsing | Before rinsing | After rinsing | Cyclic Coloration |
| 2C | Deep bluish red | Pale red (Uneven coloration) | Deep bluish red | Deep bluish red | A |
| 2D | Deep red | Not colored | Deep murex | Deep murex | A |
| 2E | Deep purplish red | Not colored | Deep purplish | Deep purplish | A |
| 2F | Deep red | Not colored | Deep red | Red | B |
| 2G | Deep murex | Not colored | Deep murex | Not colored | C |
| 2H | Deep red | Not colored | Deep red | Not colored | C |
| 2I | Deep bluish red | Pale red (Uneven coloration) | Deep purple bluish red | Deep bluish red | A |

The pigment dispersion compositions 2C to 2E and 2I excellently colored the anodic oxide film B. On the other hand, the pigment dispersion compositions 2G and 2H did not exhibit excellent coloration after the washing process. This is because the pigments included in the pigment dispersion compositions 2G and 2H each had a specific surface area of greater than 30 $m^2/g$. More specifically, these pigments, though the diameters of primary particles thereof were small, were not easily disaggregated. As a result, the content of pigment particles having larger particle diameters increased, i.e., the percentage of pigment particles impassable through a sieve having a mesh size of 300 nm exceeded 30%, and the median particle size became greater than 250 nm. The pigment dispersion composition 2F including pigment particles having a median particle size of 240 nm exhibited a slightly degraded the repeated-coloration characteristics.

EXAMPLE 3

A mixture of 25% by weight of an acrylic acid-styrene copolymer (available from Johnson Polymer Co. under a trade name of JONCRYL 62), 30% by weight of each of the following phthalocyanine-type pigments and 45% by weight of water was stirred for 60 minutes by means of Labomixer to obtain a slurry. To the slurry were added 240 ml of glass beads having a diameter of 0.5 mm to 0.75 mm to increase the total volume to 300 ml, and the slurry was stirred for 30 minutes to obtain a pigment dispersion. Then, a pigment dispersion for a pigment dispersion composition 3C, 3D, 3E, 3F, 3G or 3H was subjected to Scharples-type centrifugation, and a pigment dispersion for a pigment dispersion composition 3I was not subjected to Scharples-type centrifugation. Thereafter, each pigment dispersion was diluted with water to a pigment concentration of 10% by weight, and particles having large diameters were precipitated by way of ultra-centrifugation at 10,000 rpm for 10 minutes. The supernatant solution was extracted from the pigment dispersion to obtain each of the pigment dispersion compositions 2C, 2D, 2E, 2F, 2G and 2H.

Pigment for the Pigment Dispersion Composition
3C

FASTOGEN BLUE GNPR available from Dainippon Ink & Chemicals, Inc. (C. I. Pigment Blue 15:3 with a specific surface area of 60 $m^2/g$.)

Pigment for the Pigment Dispersion Composition
3D

FASTOGEN BLUE GFA available from Dainippon Ink & Chemicals, Inc. (C. I. Pigment Blue 15:4 with a specific surface area of 50 $m^2/g$.)

Pigment for the Pigment Dispersion Composition
3E

FASTOGEN BLUE 5414 available from Dainippon Ink & Chemicals, Inc. (C. I. Pigment Blue 15:4 with a specific surface area of 40 $m^2/g$.)

Pigment for the Pigment Dispersion Composition
3F

FASTOGEN GREEN 5710 available from Dainippon Ink & Chemicals, Inc. (C. I. Pigment Green 7 with a specific surface area of 60 $m^2/g$.)

Pigment for the Pigment Dispersion Composition
3G

FASTOGEN GREEN MY available from Dainippon Ink & Chemicals, Inc. (C. I. Pigment Green 36 with a specific surface area of 55 $m^2/g$.)

Pigment for the Pigment Dispersion Composition
3H

FASTOGEN GREEN 2YK available from Dainippon Ink & Chemicals, Inc. (C. I. Pigment Green 36 with a specific surface area of 35 $m^2/g$.)

The pigment dispersion composition 3I was prepared in substantially the same manner as that employed to prepare the pigment dispersion composition 3C, except that the Scharples-type centrifugation was not carried out.

The properties of each pigment dispersion composition are shown in Table 5.

TABLE 5

| Pigment dispersion composition | 3C | 3D | 3E | 3F | 3G | 3H | 3I |
|---|---|---|---|---|---|---|---|
| Median particle size (nm) | 80 | 130 | 230 | 90 | 120 | 260 | 120 |
| Impassable particles (%) | 8 | 15 | 38 | 13 | 19 | 47 | 13 |
| Zeta potential (mV) | −39 | −37 | −42 | −33 | −43 | −41 | −40 |
| pH | 9.8 | 9.6 | 8.4 | 9.2 | 9.2 | 9.3 | 8.9 |
| Conductivity (μs/cm) | 2300 | 1600 | 1300 | 1600 | 2400 | 1900 | 2800 |
| Ionic inclusion (ppm) | 590 | 430 | 550 | 380 | 460 | 570 | 730 |

Electrophoretic coloration test and evaluation of the pigment dispersion compositions 3C to 3I were carried out in the same manner as described in EXAMPLE 2. The evaluation results are shown in Table 6.

TABLE 6

| dispersion composition | Before rinsing | After rinsing | Before rinsing | After rinsing | Cyclic Coloration |
|---|---|---|---|---|---|
| 3C | Deep blue | Pale blue (Uneven coloration) | Deep blue | Deep blue | A |
| 3D | Deep blue | Not colored | Deep blue | Deep blue | A |
| 3E | Deep blue | Not colored (Uneven coloration) | Deep blue | Pale blue (Uneven coloration) | B |
| 3F | Deep green | Pale green (Uneven coloration) | Deep green | Deep green | A |
| 3G | Deep green | Not colored | Deep green | Deep green | A |
| 3H | Deep green | Not colored | Deep green | Pale green (Uneven coloration) | C |
| 3I | Deep blue | Not colored | Deep blue | Deep blue | A |
| 3J | Deep dark green | Pale green (Uneven coloration) | Deep dark green | Deep dark green | A |

The pigment dispersion compositions 3C, 3D, 3F, 3G, 3I and 3J excellently colored the anodic oxide film B. On the other hand, the pigment dispersion compositions 3E and 3H caused uneven coloration after the washing process and exhibited a degraded repeated-coloration characteristic. This is because the pigments included in the pigment dispersion compositions 3E and 3H each had a specific surface area of greater than 45 m$^2$/g. More specifically, these pigments, though the diameters of primary particles thereof were small, were not easily disaggregated. As a result, the content of pigment particles having larger particle diameters increased, i.e., the percentage of pigment particles impassable through a sieve having a mesh size of 300 nm exceeded 30%, and the median particle size became greater than 200 nm.

What is claimed is:

1. A pigment dispersion composition for depositing in pores having diameters of 50 nm to 250 nm which are present in anodic oxide films formed on a surface of an aluminum or aluminum alloy material by way of electrophoresis for coloration, said pigment dispersion composition comprising water, a pigment dispersant and a pigment having a specific surface area of 30m$^2$/g to 100m$^2$/g, and a median particle size of not greater than 250 nm in a particle-size distribution thereof with not greater than 30% of pigment particles being impassable through a sieve having a mesh size of 300 nm.

2. A pigment dispersion composition as set forth in claim 1, wherein said pigment includes pigment particles of a compound selected from the group consisting of an inorganic compound, an organic compound, a synthetic resin and colored compound thereof.

3. A pigment dispersion composition as set forth in claim 1, wherein said pigment includes one or more reddish pigments selected from the group consisting of quinacridone-type, anthraquinone-type, diketopyrrolopyrrole-type, perylene-type and perinone-type compounds and derivatives thereof, and has a median particle size of not greater than 200 nm.

4. A pigment dispersion composition as set forth in claim 1, wherein said pigment includes a phthalocyanine-based compound or a derivative thereof, and has a specific surface area of 45 m$^2$/g to 100 m$^2$/g and a median particle size of not greater than 200 nm in a particle-size distribution.

5. A pigment dispersion composition as set forth in claim 1, wherein said pigment dispersant is a water-soluble polymer compound.

6. A pigment dispersion composition as set forth in claim 1, wherein said pigment dispersant includes a polymer of one or more compounds having an α, β-ethylene bond, or a modified polymer thereof.

7. A pigment dispersion composition as set forth in claim 1, wherein said pigment dispersed therein has a zeta potential of not greater than −10 mV.

8. A pigment dispersion composition as set forth in claim 1, wherein the content of ionic inclusions is not greater than 1,000 ppm.

9. An aluminum material or aluminum alloy material comprising anodic oxide films formed on a surface thereof and having pores of diameters of 50 nm to 250 nm, said anodic oxide films being colored with a pigment dispersion composition as recited in claim 1 by depositing the pores with the pigment dispersion composition.

10. A pigment dispersion composition for depositing in pores having diameters of 50 nm to 250 nm which are present in anodic oxide films formed on a surface of an aluminum or aluminum alloy material by way of electrophoresis for coloration, said pigment dispersion composition comprising water, a pigment dispersant and a pigment having a specific surface area of 30 m$^2$/g to 100 m$^2$/g and a median particle size of not greater than 250 nm in a particle-size distribution thereof with 5 to 30% of pigment particles being impassable through a sieve having a mesh size of 300 nm.

11. A pigment dispersion composition for depositing in pores having diameters of 50 nm to 250 nm which are present in anodic oxide films formed on a surface of an aluminum or aluminum alloy material by way of electrophoresis for coloration, said pigment dispersion composition comprising water, a pigment dispersant and a pigment having a specific surface area of 30 m$^2$/g to 100 m$^2$/g and a median particle size of from 40 to 250 nm in a particle-size distribution thereof with 5 to 30% of pigment particles being impassable through a sieve having a mesh size of 300 nm.

* * * * *